United States Patent
Hanrahan et al.

(10) Patent No.: US 11,143,142 B2
(45) Date of Patent: Oct. 12, 2021

(54) ADAPTIVE ENGINE WITH BOOST SPOOL

(71) Applicant: United Technologies Corporation, Farmington, CT (US)

(72) Inventors: Paul R. Hanrahan, Farmington, CT (US); Daniel Bernard Kupratis, Wallingford, CT (US)

(73) Assignee: United Technologies Corporation, Farmington, CT (US)

( * ) Notice: Subject to any disclaimer, the term of this patent is extended or adjusted under 35 U.S.C. 154(b) by 257 days.

(21) Appl. No.: 16/051,688

(22) Filed: Aug. 1, 2018

(65) Prior Publication Data

US 2020/0040848 A1    Feb. 6, 2020

(51) Int. Cl.

| F02C 6/08 | (2006.01) |
|---|---|
| F02K 3/077 | (2006.01) |
| F02C 7/36 | (2006.01) |
| F02K 3/06 | (2006.01) |
| F02C 3/13 | (2006.01) |
| F02K 3/12 | (2006.01) |

(52) U.S. Cl.
CPC ............... *F02K 3/077* (2013.01); *F02C 7/36* (2013.01); *F02K 3/06* (2013.01); *F02C 3/13* (2013.01); *F02C 6/08* (2013.01); *F02K 3/12* (2013.01); *F05D 2260/4023* (2013.01)

(58) Field of Classification Search
CPC ...... F02C 6/02; F02C 6/08; F02C 7/36; F02C 3/107; F02C 3/113; F02C 3/13; F02C 9/18; F02C 7/32; F02C 9/42; F02K 3/12; F02K 3/08

See application file for complete search history.

(56) References Cited

U.S. PATENT DOCUMENTS

| 3,368,352 A | 2/1968 | Hewson |
|---|---|---|
| 3,677,012 A * | 7/1972 | Batscha ............... F02K 3/065 60/262 |
| 4,120,150 A * | 10/1978 | Wakeman ............ F02C 7/224 60/39.091 |

(Continued)

FOREIGN PATENT DOCUMENTS

| FR | 2710109 A1 | 3/1995 |
|---|---|---|
| GB | 633723 | 12/1949 |
| GB | 1392122 | 4/1975 |

OTHER PUBLICATIONS

Extended European Search Report for EP Application No. 19189434.4, dated Dec. 12, 2019, pp. 7.

*Primary Examiner* — Thomas P Burke
(74) *Attorney, Agent, or Firm* — Kinney & Lange, P. A.

(57) ABSTRACT

A gas turbine engine includes a first spool, a second spool, a primary combustor, and a diffuser. The first spool includes a first compressor rotationally driven by a first turbine via a first shaft. The second spool includes a second compressor driven by a second turbine via a second shaft. The first compressor, the diffuser, and the primary combustor are arranged in series to provide a compressed airflow discharged from the first compressor to the primary combustor via the diffuser, which includes walls that diverge towards the primary combustor. The second compressor is fluidly coupled to the diffuser to receive at least a portion of the compressed airflow from the diffuser. The second turbine is fluidly coupled to the diffuser to discharge an expanded airflow to the diffuser.

17 Claims, 8 Drawing Sheets

(56) References Cited

U.S. PATENT DOCUMENTS

| | | | | |
|---|---|---|---|---|
| 4,856,962 A * | 8/1989 | McDow | ............... | F01D 17/162 |
| | | | | 415/115 |
| 5,048,285 A * | 9/1991 | Schmitt | .................... | F02C 9/00 |
| | | | | 60/204 |
| 6,634,863 B1 | 10/2003 | Forrester et al. | | |
| 6,739,120 B2 | 5/2004 | Moniz et al. | | |
| 9,777,593 B2 | 10/2017 | Kirkpatrick et al. | | |
| 2009/0060729 A1 * | 3/2009 | Bland | ...................... | F02C 6/10 |
| | | | | 415/202 |
| 2010/0170262 A1 * | 7/2010 | Kaslusky | ............... | F01D 15/10 |
| | | | | 60/778 |
| 2010/0326085 A1 * | 12/2010 | Veilleux | .................... | F01D 1/16 |
| | | | | 60/778 |
| 2012/0153076 A1 * | 6/2012 | Burns | ................... | B64D 41/00 |
| | | | | 244/58 |
| 2013/0145744 A1 * | 6/2013 | Lo | ........................ | F01D 17/105 |
| | | | | 60/226.3 |
| 2016/0376021 A1 * | 12/2016 | Ullyott | ..................... | F02C 7/36 |
| | | | | 60/783 |
| 2017/0074277 A1 | 3/2017 | Kray et al. | | |

* cited by examiner

ADAPTIVE ENGINE WITH BOOST SPOOL

BACKGROUND

The present disclosure relates generally to gas turbine engines and, more particularly, to gas turbine engines capable of operating in a high overall pressure ratio (OPR) mode and in a low OPR mode to adapt to the ambient conditions and to provide more efficient operation without exceeding thermal limits of the gas turbine engine.

The overall pressure ratio (OPR) is a measure of the total pressure rise in a gas turbine engine (i.e., a pressure ratio equal to the air pressure discharged from the last compressor stage and the ambient air pressure entering the engine). Generally speaking, as OPR increases, the thermodynamic efficiency of the gas turbine engine increases, enabling the engine to consume less fuel per unit of thrust (i.e., thrust specific fuel consumption or TSFC) than a corresponding engine with lower OPR. However, air temperatures within the gas turbine engine increase with increasing OPR and can produce temperatures within the compressor section and/or turbine section that exceed permissible material and structural limits. Furthermore, the maximum temperature within the compressor and the turbine increase as the ambient temperature increases, adding to the temperature increase associated with the OPR of the engine.

Conventionally, turbine temperatures are maintained within acceptable limits by limiting OPR to a ratio that produces acceptable turbine temperatures for worst case ambient conditions, typically, design conditions corresponding to hot day take-off. While this technique produces a gas turbine engine design that provides an acceptable compromise for a variety of operating conditions, limiting OPR for hot day take-off conditions produces a gas turbine engine that operates at less OPR than otherwise possible at cruise power, reducing engine efficiency when high efficiency, low fuel consumption operation is most advantageous to extend aircraft range or payload capacity.

SUMMARY

In one example of this disclosure, a gas turbine engine includes a first spool, a second spool, a primary combustor, and a diffuser. The first spool includes a first compressor rotationally driven by a first turbine via a first shaft. The second spool includes a second compressor driven by a second turbine via a second shaft. The first compressor, diffuser, and the primary combustor are arranged in series to provide a compressed airflow discharged from the first compressor to the primary combustor via the diffuser, which includes walls that diverge towards the primary combustor. The second compressor is fluidly coupled to the diffuser to receive at least a portion of the compressed airflow from the diffuser. The second turbine is fluidly coupled to the diffuser to discharge an expanded airflow to the diffuser.

In another example of this disclosure, a gas turbine engine includes a boost spool in which the boost spool includes an inlet characterized by an inlet pressure, a boost compressor section characterized by a turbine pressure ratio, and an outlet characterized by an outlet pressure. The product of the compressor pressure ratio and the turbine pressure ratio produces a pressure ratio equal to the outlet pressure divided by the inlet pressure that is greater than 0.9:1 and less than 1.8:1, inclusive.

DETAILED DESCRIPTION

As described herein, a gas turbine engine has a boost spool that can be selectively engaged to increase overall pressure ratio (OPR) during certain engine power levels (e.g., cruise power) while operating the gas turbine engine without the boost spool during other power levels (e.g., takeoff power). With this arrangement, the gas turbine engine can operate within thermal limits when ambient conditions limit the OPR and can operate with greater engine efficiency when ambient temperatures are lower and permit higher OPR operation.

Boost spools can be used to augment the OPR of any gas turbine engine that can benefit from adaptable OPR, but is particularly useful for gas turbine engines used to propel aircraft. For instance, the boost spool can be added to a single spool gas turbine engine having one or more compressor stages and one or more turbine stages rotating on a common shaft. Multi-spool engines (i.e., engines with two or more spools) also benefit from selective operation of a boost spool, which have two or more compressor sections and two or more turbine sections, each section having one or more stages. For example, dual spool engines have a high pressure spool (i.e., a high pressure compressor driven by a high pressure turbine) and a low pressure spool (i.e., a low pressure compressor driven by a low pressure turbine), each spool rotating independently of the other and, in some operating modes (e.g., engine starting), can be rotationally coupled together. For each of these engines, the boost spool receives airflow from one of the compressor stages and compresses the air stream before extracting work in addition to the work produced by one or more spools of the gas turbine engine.

A maximum increase in OPR can be achieved by directing a compressed air stream that is downstream of the last compressor stage to the boost spool inlet (e.g., air from a diffuser that is positioned downstream of the last compressor stage and upstream from the combustor). In a non-limiting example, if a boost spool having a pressure ratio (PR) (i.e., the pressure ratio between the boost compressor outlet and the boost compressor inlet) equal to about 2.5 receives air from the diffuser of a gas turbine engine having an unboosted OPR equal to about 40 that is reduced to 30 at cruise power, the OPR of the gas turbine engine operating with the boost spool at cruise power is increased to 75. Accordingly, with selective boost spool operation, the gas turbine engine of the above example can operate with OPR equal to 40 at take-off power and can operate with OPR equal to 75 at cruise power and thereby improve thrust specific fuel consumption (TSFC) at cruise power while maintaining turbine temperatures within acceptable limits at take-off power.

Figure 1A:
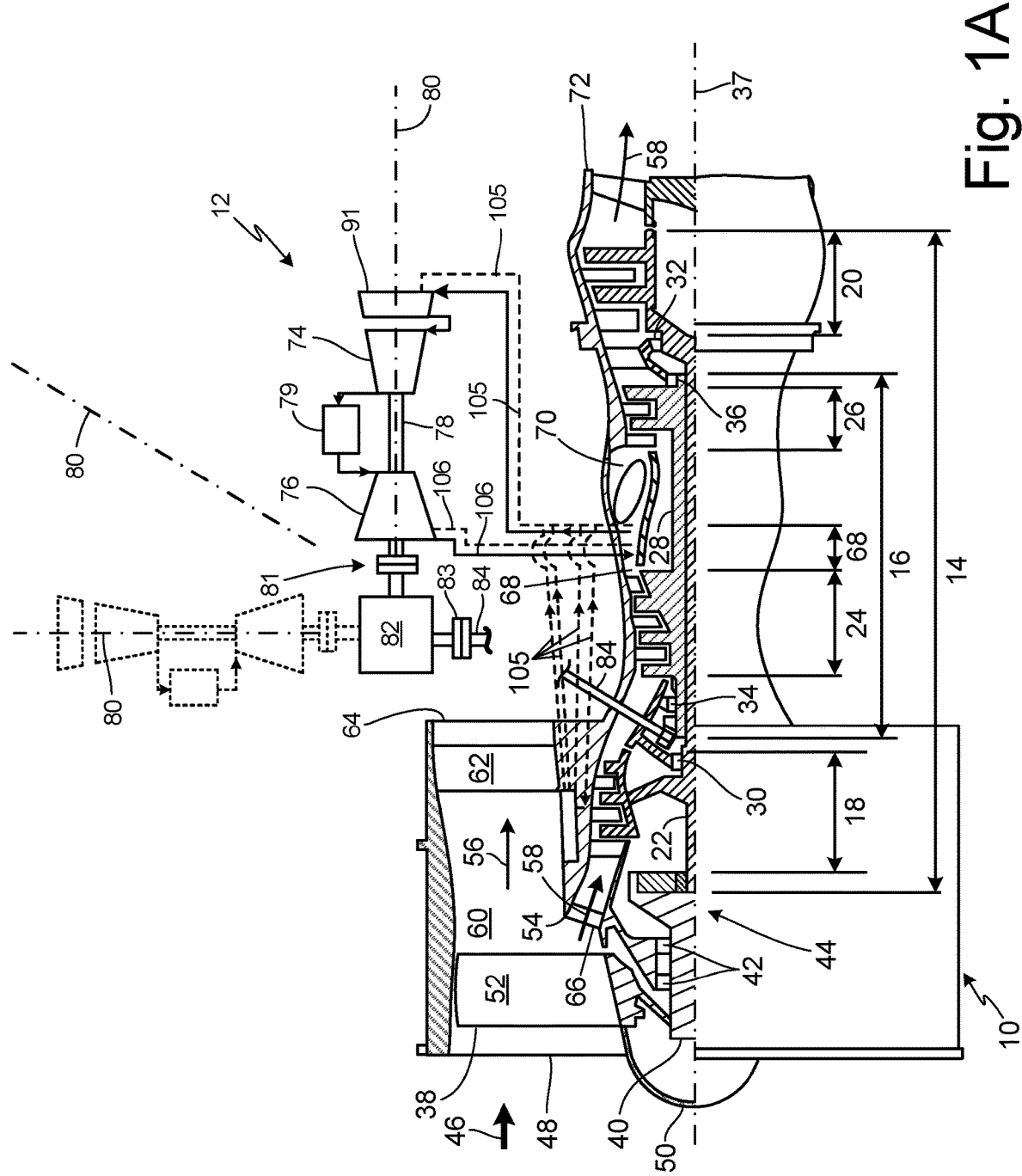
FIGS. 1A and 1B are schematic representations of a gas turbine engine mechanically coupled to a boost spool.

FIG. 1A is a schematic representation of gas turbine engine 10 that includes boost spool 12 in accordance with an exemplary embodiment of this disclosure. Gas turbine engine 10 is a dual spool engine that includes low pressure spool 14 and high pressure spool 16. Low pressure spool 14 includes low pressure compressor 18 mechanically and rotationally connected to low pressure turbine 20 by shaft 22, and high pressure spool 16 includes high pressure compressor 24 mechanically and rotationally connected to high pressure turbine 26 by shaft 28. Bearings 30 and 32 support shaft 22 of low pressure spool 14, and bearings 34 and 36 support shaft 28 of high pressure spool 16, each at forward and aft shaft ends, respectively. Low pressure spool 14 and high pressure spool 16 are coaxial, each extending along and rotating about centerline axis 37 independently of one another.

Compressors and turbines 18, 20, 24, and 26 include at least one compressor stage or turbine stage, each stage formed by a row of stationary vanes and a row of rotating blades. In the exemplary embodiment depicted by FIG. 1A, each of low pressure compressor 18 and high pressure compressor 24 has three stages, and each of low pressure turbine 20 and high pressure turbine 26 has two stages, although the number of stages in each compressor or turbine can be selected based on the desired pressure ratios as is known in the art.

Gas turbine engine 10 also includes fan 38 mounted to fan shaft 40. One or more bearings 42 support fan shaft 40, which is mechanically and rotationally coupled to low pressure spool 14. Fan shaft 40 may be directly connected to shaft 22 of low pressure spool 14. With this arrangement, fan 38 and fan shaft 40 rotate at the same speed and in the same direction as low pressure spool 14. In other embodiments, such as the exemplary embodiment depicted in FIG. 1A, fan shaft 40 may be rotationally coupled to shaft 22 via gearing 44. For instance, gearing 44 can be an epicyclic gear train that includes a central sun gear mounted to shaft 22, a ring gear mounted to fan shaft 40, and a plurality of plant gears circumferentially spaced about the sun gear and mechanically engaging the ring gear and the sun gear, the planet gears being supported by a planet carrier (not shown). The manner in which epicyclic gear trains (e.g., gearing 44) function is known in the art and will not be described in further detail here. Generally, gas turbine engines utilizing epicyclic gearing to drive fan 38 and fan shaft 40 restrain the planet carrier to cause fan shaft 40 to rotate slower (and in the opposite direction) than low pressure spool 14. Accordingly, fan 38 and low pressure spool 14 can rotate at speeds that are more efficient for respective blade geometries.

In operation, ambient air flow 46 is guided into inlet 48 by nose cone 50. Rotation of fan 38, which includes circumferentially spaced fan blades 52, compresses ambient air flow 46 before splitter 54 divides flow 46 into bypass flow 56 and core flow 58. Bypass flow 56 passes through bypass duct 60 to structural guide vanes 62 and discharges from engine 10 through a bypass flow exhaust nozzle (not shown), which is downstream from structural guide vane outlet 64. Inlet guide vanes 66 guide core flow 58 into low pressure compressor 18 that subsequently flows into high pressure compressor 24, each compressor stage further compressing core flow 58. Compressed core flow 58 discharges from high pressure compressor 24 into diffuser 68. Diffuser 68 fluidly connects high pressure compressor 24 to combustor 70 and includes divergent walls that reduce core flow 58 velocity and thereby increase static pressure of flow 58 before entering combustor 70. Combustor 70 can be an annular combustor (or another suitable design). Fuel injected into combustor 70 mixes with compressed core flow 58, and one or more ignitors combust the fuel-to-air mixture to produce a compressed and heated core flow 58 that is discharged into high pressure turbine 26. Core flow 58 interacts with vanes and blades of high pressure turbine 26 causing rotation of shaft 28 about centerline axis 37 and driving rotation of high pressure compressor 24. Similarly, core flow 58 interacting with vanes and blades of lower pressure turbine 20 cause rotation of shaft 22 about centerline axis 37 to drive rotation of low pressure compressor 18 as well as fan shaft 40 directly or via gearing 44. Downstream of low pressure turbine 20, core flow 58 discharges from engine 10 through exhaust nozzle 72.

Figure 2A:
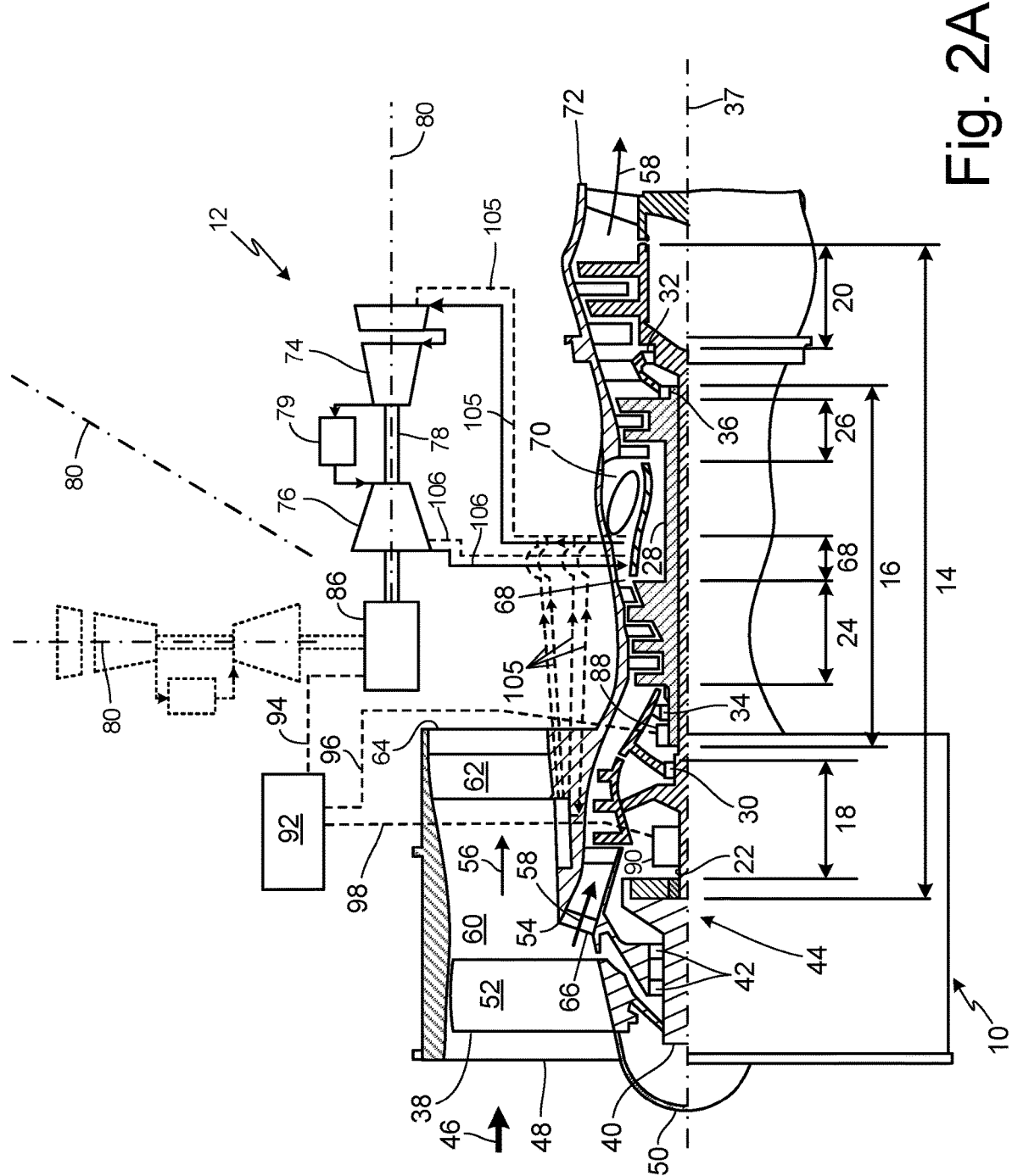
FIGS. 2A and 2B are schematic representations of a gas turbine engine electromechanically coupled to a boost spool.

Boost spool 12 includes boost compressor 74 mechanically and rotationally connected to boost turbine 76 by shaft 78, each component being coaxial with boost axis 80. Boost spool 12 can be mechanically and rotationally coupled to one or more spools of gas turbine engine 10 (e.g., low pressure spool 14 and/or high pressure spool 16) by any suitable mechanical means. Alternatively, boost spool 12 can be electromechanically coupled to one or more spools of gas turbine engine 10 as shown in FIG. 2A and discussed further below.

In some embodiments, boost spool 12 includes combustor 79 disposed to receive a compressed boost flow from boost compressor 74. Within combustor 79, injectors distribute fuel that mixes with the compressed boost flow and ignitors initiate combustion to provide a heated and compressed boost flow to boost turbine 76. The heated and compressed boost flow interacts with blades and vanes within turbine 76 to cause rotation of turbine 76 about boost axis 80. The rotation of turbine 76 drives compressor 74 as well as at least one of high pressure spool 16 and low pressure spool 14 as discussed below. Boost flow exiting turbine 76 returns to gas turbine engine 10. For instance, the embodiment depicted by FIG. 1A discharges the boost flow to diffuser 68.

The position and orientation of boost spool 12 relative to gas turbine 10 is selected base on the particular details of the mechanical coupling to gas turbine engine 10. Boost axis 80 can be parallel and offset from centerline axis 37 of gas turbine engine 10 as schematically shown by FIG. 1A. Furthermore, FIG. 1A shows boost spool 12 with a reverse flow orientation (i.e., aft-to-forward flow) such that a flow direction through boost spool 12 from compressor 74 to turbine 76 is opposite a flow direction (i.e., forward-to-aft flow) through gas turbine engine 10 from inlet 48 to outlet 64 and nozzle 72. Alternatively, boost axis 80 can be oblique or perpendicular to centerline axis 37.

For example, in the exemplary embodiment depicted by FIG. 1A, boost spool 12 is mechanically coupled to high pressure spool 16 via clutch 81, auxiliary gear box 82, main clutch 83, and tower shaft 84. Gearing at the inboard end of tower shaft 84 enmeshes with a corresponding gear mounted on high pressure spool shaft 28. Powered by at least one of low pressure spool 14 and high pressure spool 16, auxiliary gear box 82 drives one or more auxiliary components and/or systems of gas turbine engine 10 such as motor-generators, fuel and/or oil pumps, among others. As shown in FIG. 1A, auxiliary gear box 82 is driven by high pressure spool 16. Boost clutch 81 is mounted to boost spool 12 and selectively couples boost shaft 78 or an extension shaft connected to shaft 78 to auxiliary gear box 82. Main clutch 83 is used to mechanically and rotationally couple tower shaft 84 to auxiliary gear box 82. When boost clutch 81 and main clutch 83 are engaged, boost turbine 76 drives high pressure spool 16 in addition to boost compressor 74. In the disengaged position, clutch 81 uncouples boost turbine 74 from gas turbine engine 10 and permits boost spool 12 to rotate independently of gas turbine engine 10. Moreover, disengaging main clutch 83 uncouples auxiliary gear box 82 from high pressure spool 16.

In another exemplary embodiment, boost spool 12 can be mechanically coupled to low pressure spool 14 in a similar manner to the high pressure spool 16. In this instance, tower shaft 84 can engage a gear mounted on shaft 22 (e.g., in region between bearing 30 and an end of high pressure spool shaft 34). With this arrangement, boost spool 12 drives low pressure spool 14 through auxiliary gear box 82, tower shaft 84, and associated gearing. Boost clutch 81 and main clutch 83 selectively couple boost spool 12 to shaft 22 of low pressure spool 14. With clutches 81 and 83 engaged, boost turbine 76 drives shaft 22 of low pressure spool 14. When one or both of clutches 81 and 83 are disengaged, boost spool 12 rotates independently of gas turbine engine 10.

In other embodiments, boost spool 12 can engage a gearbox of engine 10 that is mechanically coupled to one or more spools (e.g. low pressure spool 14 or high pressure spool 16) of engine 10. In these embodiments, boost spool 12 can be mechanically coupled to one or more spools of the gas turbine engine via a gear box without the addition of tower shaft 84. Additionally, main clutch 83 can be mounted to a spool shaft (e.g., low pressure spool shaft 22 or high pressure spool shaft 28) in lieu of tower shaft 84, operating in essentially the same manner as described with respect to the embodiments with tower shaft 84.

Engines with an electromechanically coupled boost spool replace clutch 81, auxiliary gear box 82, main clutch 83, and tower shaft 84 with electric machines and control circuitry as shown in FIG. 2A. For example, boost spool 12 can include electric machine 86 mounted on boost shaft 78 or an extension of boost shaft 78. High pressure spool 16 of gas turbine engine 10 can include a second electric machine 88 mounted on shaft 28 (e.g., at the end of shaft 28 forward of bearing 34). Additionally, low pressure spool 14 can include electric machine 90 mounted to shaft 22 (e.g., in a region between bearing 30 and an end of high pressure spool shaft 28 or in a region adjacent gearing 44 as shown). Controller and motor drive 92 along with electrical connections 94, 96, and 98 electrically couple boost spool electric machine 86 to high pressure spool electric machine 88 and to low pressure spool electric machine 90. Controller and motor drive 92 manages electric power delivery from boost spool electric machine 86 and in some embodiments manages electric power delivery to boost spool electric machine 86. As shown in FIG. 2A, electrical connection 94 extends from electric machine 86 to controller 92; electrical connection 96 extends from controller 92 to electric machine 88; and electrical connection 98 extends from controller 92 to electric machine 90, although other arrangements are possible as known in the art. While FIG. 2A depicts an embodiment where boost spool 12 is electrically coupled to multiple electric machines, in other exemplary embodiments, boost spool 12 can be electrically coupled to high pressure spool electric machine 88 only or can be electrically coupled to low pressure spool electric machine 90 only.

Boost spool electric machine 86 can be a generator (e.g., a permanent magnet generator) capable of producing electric power, and electric machines 88 and 90 can be electric motors. In this instance, rotation of boost spool 12 provides electric power to drive high pressure spool 16 and/or low pressure spool 14 only. In other embodiments, each of electric machines 86, 88, and 90 can be motor-generators, capable of producing electric power or being driven by electric power received from one of the other motor-generators operating in generator mode. Electrically coupling boost spool 12 to gas turbine engine 10 in this manner provides greater flexibility in mounting options, permitting boost spool 12 to be positioned and orientated in any way relative to centerline 37 of gas turbine engine 12.

For all mounting positions of boost spool 12, the location and orientation of boost spool 12 permits boost spool 12 to receive a compressed air flow from gas turbine engine 10 and to discharge an expanded air flow to gas turbine engine 10. Boost spool 12 can receive a compressed airflow from any compressor stage of gas turbine engine 10 to achieve varying degrees of boost compression. In one exemplary embodiment, boost spool 12 receives a compressed air flow from a location that is downstream from the last compressor stage of the gas turbine engine. In the case of gas turbine engine 10, boost spool 12 receives airflow from diffuser 68 and discharges an expanded airflow to diffuser 68, which is downstream of high pressure compressor 24 and upstream from combustor 70.

Figure 1B:
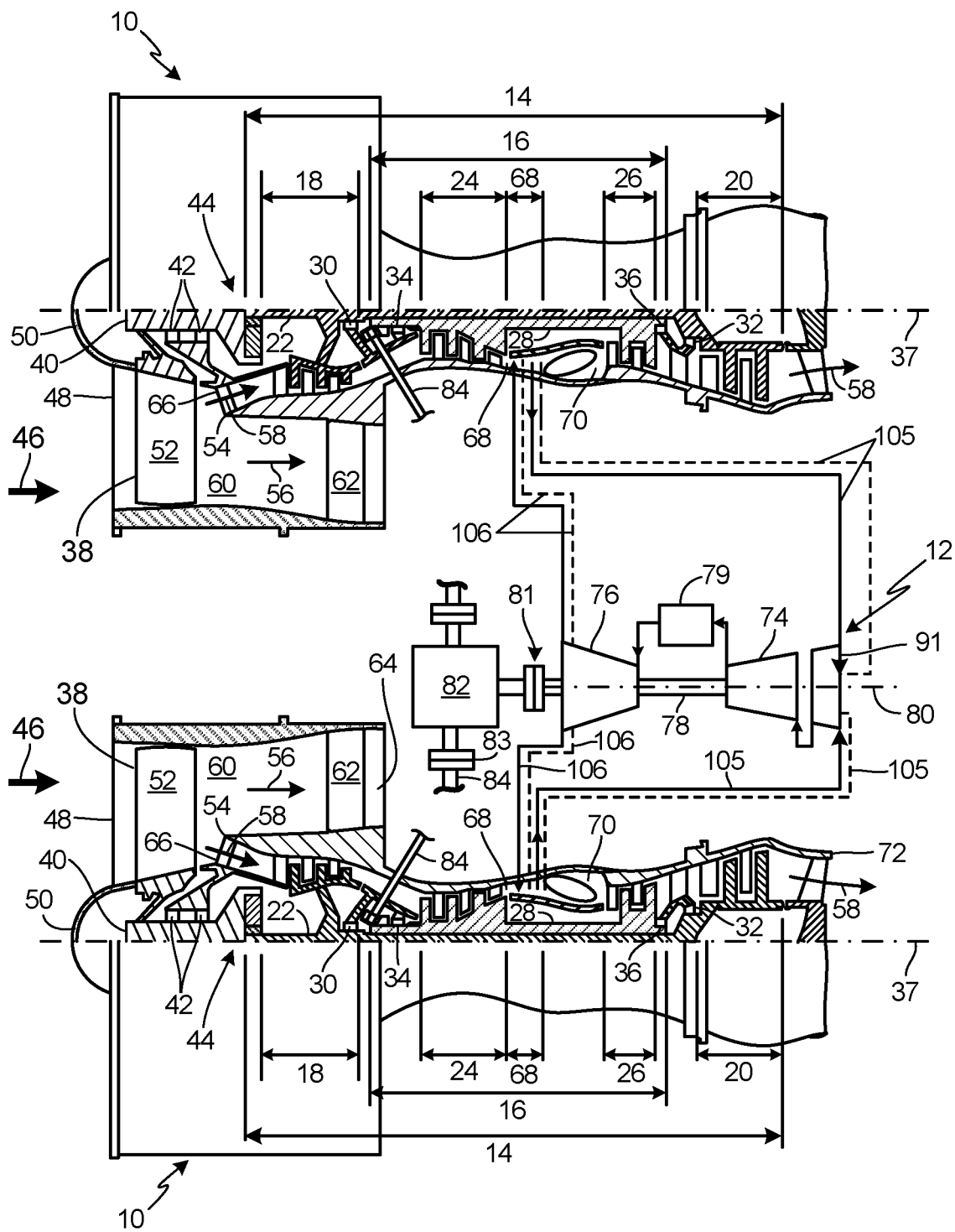
Figure 2B:
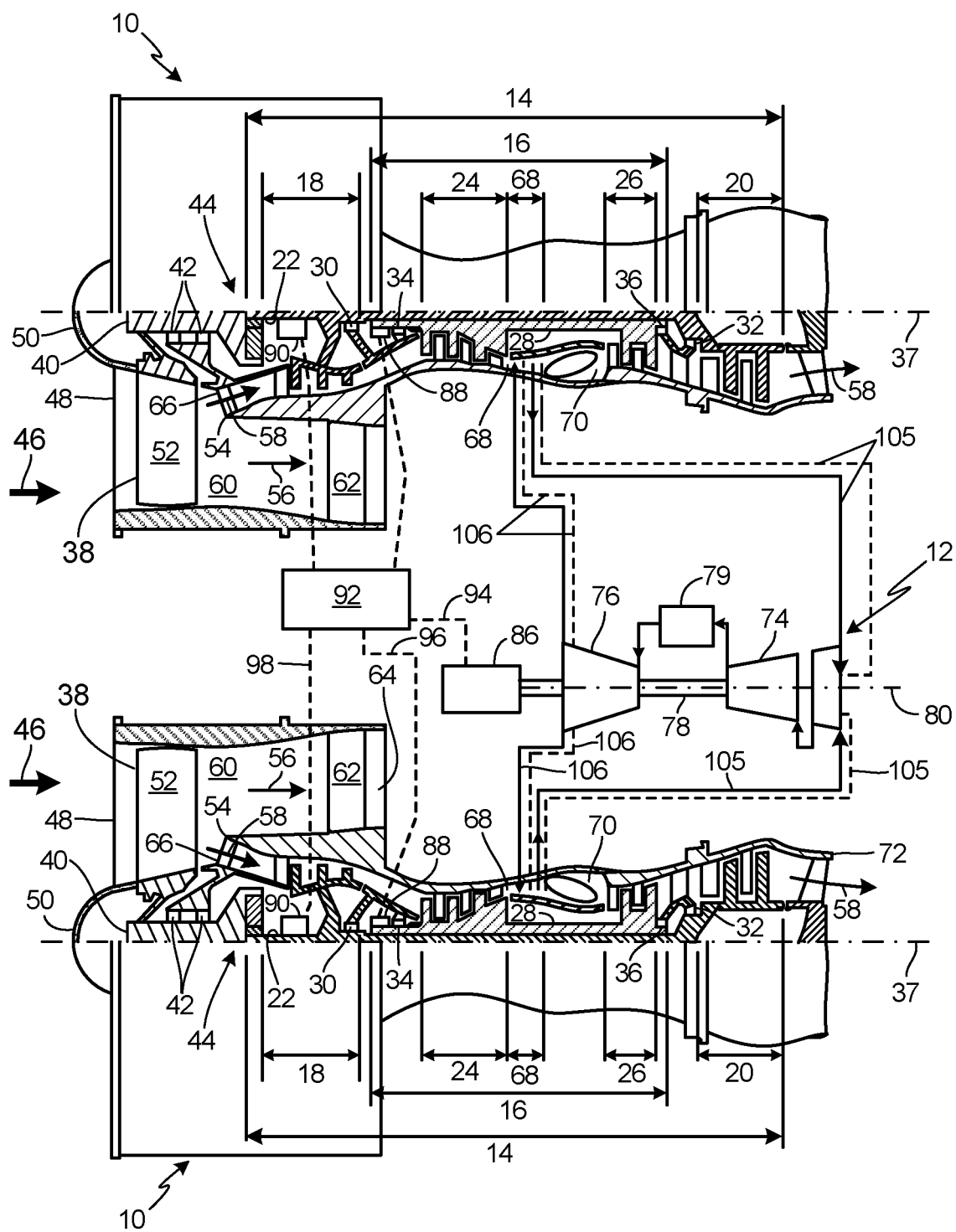

Additionally, while FIGS. 1A and 2A depict boost spool 12 fluidly coupled to only one gas turbine engine 10, boost spool 12 can be fluidly coupled to two or more gas turbine engines 10, each fluidic coupling achieved in essentially the same manner as described with reference to FIG. 1A or FIG. 2A. For instance, in a multi-engine aircraft, boost spool 12 can be fluidly coupled to a first diffuser 68 of a first gas turbine engine 10 and to a second diffuser 68 of a second gas turbine engine 10 as depicted by FIGS. 1B and 2B. In this arrangement, compressor 74 receives a portion of flow from the first diffuser 68 and a portion of flow from the second diffuser 68. Turbine 76 discharges an expanded airflow to each of first diffuser 68 and second diffuser 68 of the first and second gas turbine engines 10, respectively. Furthermore, boost spool 12 can be mechanically coupled to one or both gas turbine engines as depicted by FIG. 1B, if the gas turbine engines 10 are in close proximity. Alternatively, boost spool 12 can be remotely located at a location intermediate of first and second gas turbine engines 10. In this arrangement, boost spool 12 can be electromechanically coupled to each gas turbine engine 10 as described in FIG. 2A and shown in FIG. 2B.

Boost spool 12 can include variable inlet vanes 91 which form an array of circumferentially spaced vanes at an inlet to boost spool 12 and upstream of boost compressor 74. Each vane 91 extends radially across the boost spool inlet and is capable of pivoting about a vane axis aligned with a radial direction relative to boost axis 80. During operation of boost spool 12, variable inlet vanes 91 can pivot to reduce or increase the open inlet area in order to vary the amount of core flow 58 diverted into boost compressor 74.

Without a load applied to boost spool turbine 76, boost compressor 74 and boost turbine 76 pressure ratios are selected to produce a discharge pressure into diffuser 68 that can be as different as the pressure ratio for a choked flow mixing of the two streams; in other words, the pressure at the exit of boost spool turbine 76 can be about 1.8 times the pressure at the exit of high pressure compressor 24, but is regulated to be between a ratio of about 0.8 to 1.9, inclusive. For instance, boost spool compressor 74 can have a pressure ratio (i.e., the pressure of compressed air discharged from compressor 74 divided by an inlet pressure to compressor 74) of approximately 2.5:1 and boost turbine 76 can have a pressure ratio between approximately 0.32 and 0.76 to produce a ratio of boost discharge pressure to boost inlet pressure within 0.8 to 1.9, inclusive. In some embodiments, the ratio is between about 0.9 and 1.7, inclusive, the pressure ratios of boost compressor 74 and boost turbine 76 adjusted accordingly. In still other embodiments, the discharge pressure of boost spool 12 is greater than or equal to the inlet pressure and less than or equal to 1.5 times the inlet pressure of boost spool 12. As the discharge pressure of boost spool 12 approaches the inlet pressure of boost spool 12 (or the pressure within diffuser 68 adjacent to the boost spool discharge port or ports), the degree of mixing of the boost spool and core flows decreases—thereby reducing pressure loss due to the mixing between the flows. However, the boost spool discharge pressure can be greater than or less than the boost spool inlet pressure by a greater degree if the mixing pressure loss does not unduly impact gas turbine engine operation or efficiency and additional mixing between the boost spool discharge and core flows is desired.

Figure 3:
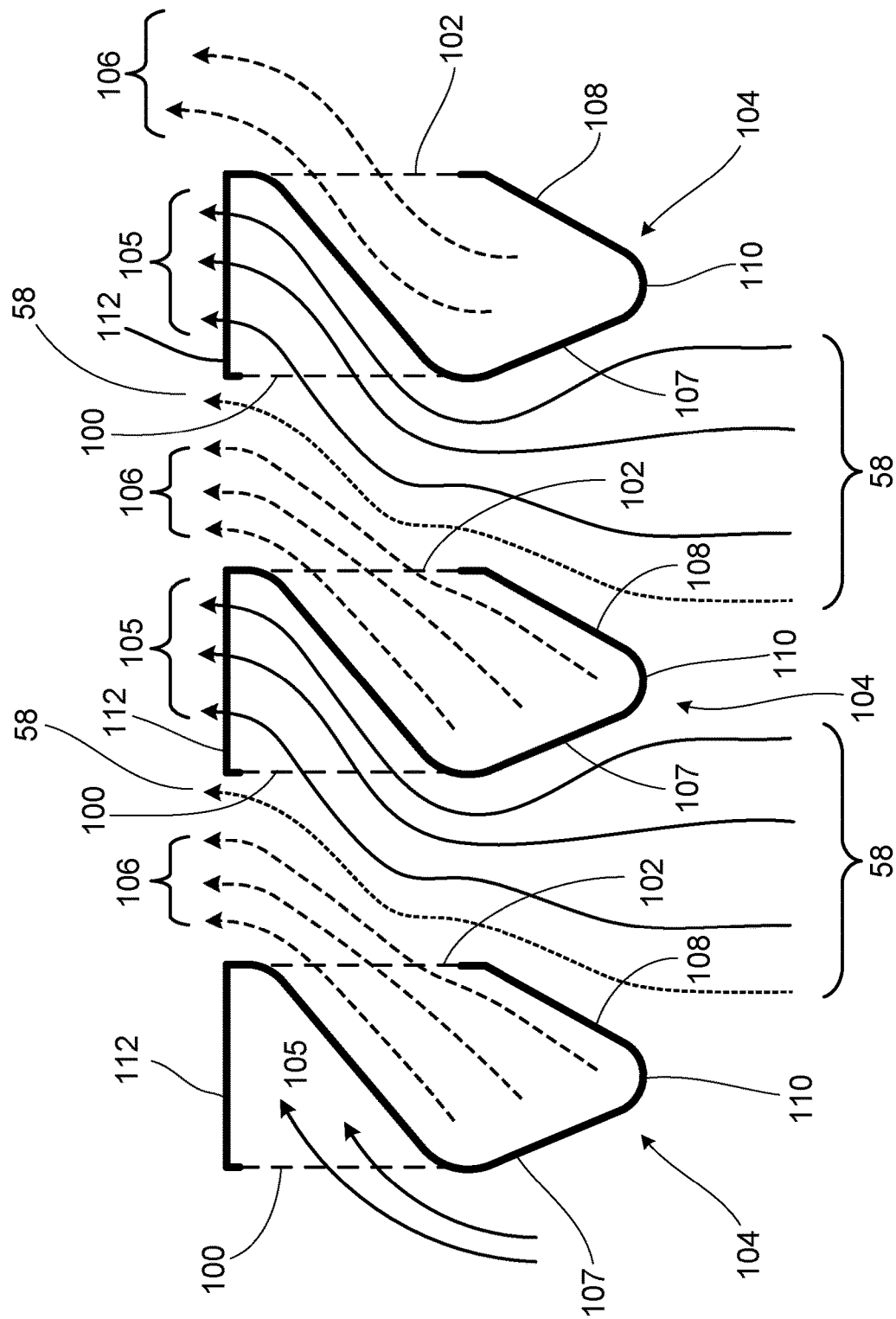
FIG. 3 is a schematic representation of a diffuser within which a portion of core flow enters inlets of the boost spool and discharges from outlets of the boost spool during boost spool operation.

With continued reference to FIGS. 1A, 1B, 2A, and 2B, the position of inlet and discharge ports can be positioned along peripheral walls of diffuser 68 or, as depicted schematically in FIG. 3, inlet 100 and outlet 102 can be positioned within diffuser strut 104, which extends from a radially inner wall of diffuser 68 to a radially outer wall of diffuser 68. Multiple struts 104 can be circumferentially spaced about centerline axis 37 concentric with diffuser 68, each strut 104 including inlet 100 and outlet 102. Three struts 104 are shown in FIG. 3, each having an inlet 100 and an outlet 102 that fluidly couple diffuser 68 to boost compressor 74 and boost turbine 76, respectively. FIG. 3 depicts only one inlet 100 and one outlet 102, each being located within a single strut or different struts. In other instances, two or more inlets 100 and two or more outlets 102 can be used, the number of inlets 100 and outlets 102 not necessarily the same. The number, size, and location of each inlet 100 and outlet 102 can be selected based on: 1) the desired mass flow rate through inlet duct 105 into boost compressor 74 during operation and 2) the desired distribution of extracted core flow 58 and/or the boost flow discharged through outlet duct 106.

Where a single inlet and outlet is used, a single inlet duct 105 extends from inlet 100 to the boost spool inlet (see FIGS. 1A and 2A) to fluidly couple diffuser 68 to boost compressor 74, and a single exhaust duct 106 extends from an exit of the boost turbine 76 to outlet 102 in one of diffuser struts 104 to fluidly couple turbine 76 to diffuser 68. Embodiments having two or more inlets and outlets have multiple inlet ducts 105 (as shown schematically by dashed lines) extending from each inlet 100 to an inlet of boost spool 12 and multiple exhaust ducts 106 (as shown schematically by dashed lines) extending from the exit of boost turbine 76 to each outlet 102. These inlet ducts 105 and outlet ducts 106 can remain discrete or can be combined with a manifold or branching duct as needed to fluidly couple boost spool 12 to diffuser 68.

In the embodiment shown in FIG. 3, each strut 104 includes first and second side walls 107 and 108 extending from leading edge 110 of strut 104 to rear wall 112. Inlets 100 are disposed in one of sidewalls 107 and 108 while outlets 102 are disposed in the other sidewall opposite the inlet sidewall. During operation of boost spool 12, a portion of compressed core flow 58 enters each inlet 100 and flows through inlet ducts 105 to the inlet of boost spool 12 and boost compressor 74. The boost spool flow exiting boost turbine 76 flows through each outlet duct 106 before discharging through each outlet 102 into diffuser 68.

Figure 4:
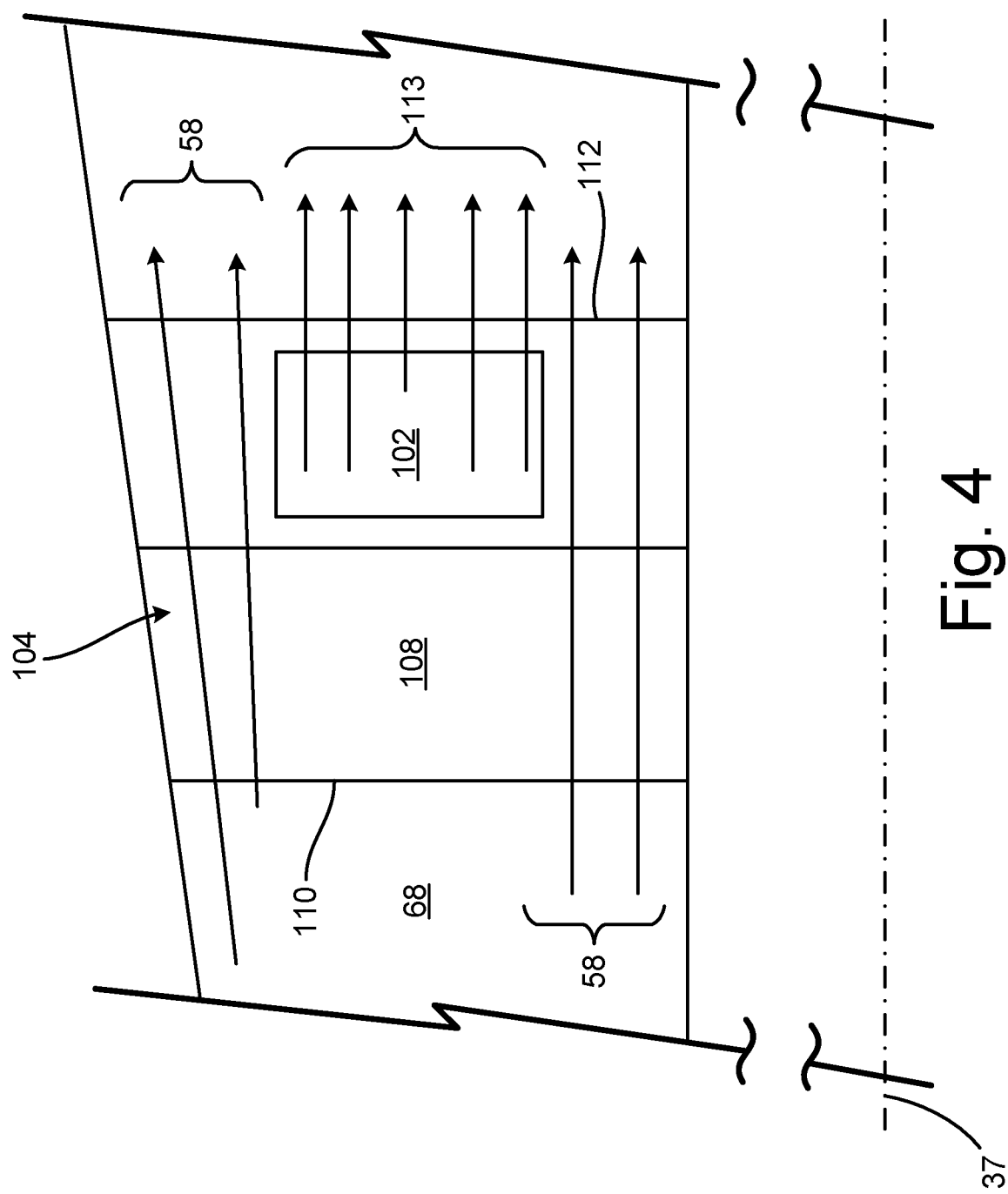
FIG. 4 is a schematic representation of a diffuser strut having a boost spool outlet located in a midspan region of the diffuser strut.
Figure 5:
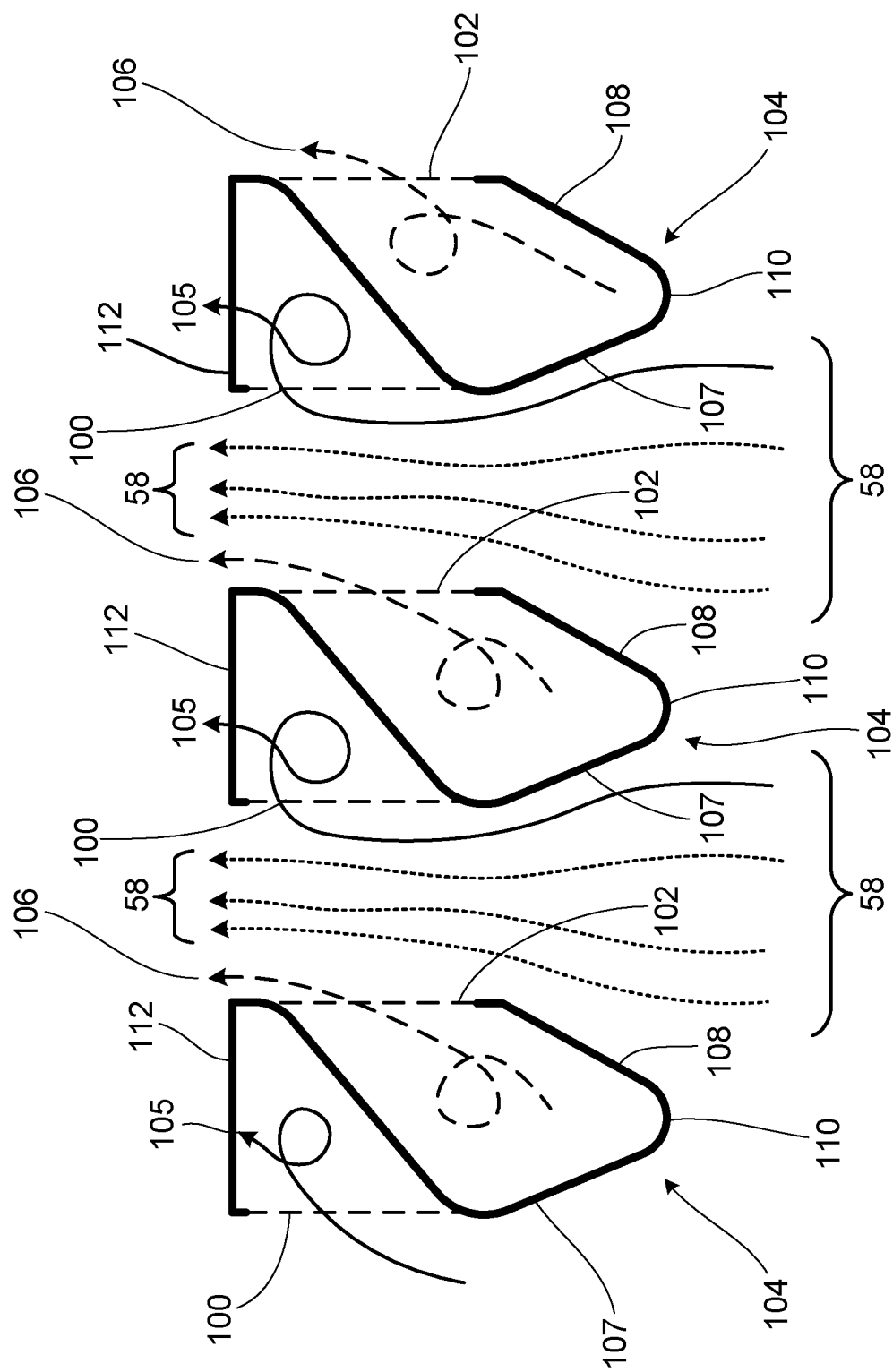
FIG. 5 is a schematic representation of core flow within the diffuser when the boost spool is not operating.

In some embodiments, inlets 100 and outlets 102 are disposed along a midspan portion of each strut 104, being located in a region approximately half way between the radially inner and radially outer peripheral walls of diffuser 68. For example, in some embodiments, the outlets 102 are disposed between 20% and 80% of the average radial span of each strut 104. In other embodiments, outlets 104 are disposed between 30% and 70% of the average radial span of each strut 104. This arrangement permits boost spool discharge flow 113 to be biased towards a central portion of the diffuser cross-sectional flow area as depicted by FIG. 4. As a result, the relatively cooler core flow 58 shields the discharged boost flow 113 so that discharged boost flow 113 does not immediately impinge on the sidewalls of combustor 70 downstream from diffuser 68. When boost spool 12 is not operating, core flow 58 passes through diffuser 68 without being compressed by boost spool 12. Only a small amount of core flow 58 passes into or out of inlets 100 and outlets 102 as shown in FIG. 5.

Figure 6:
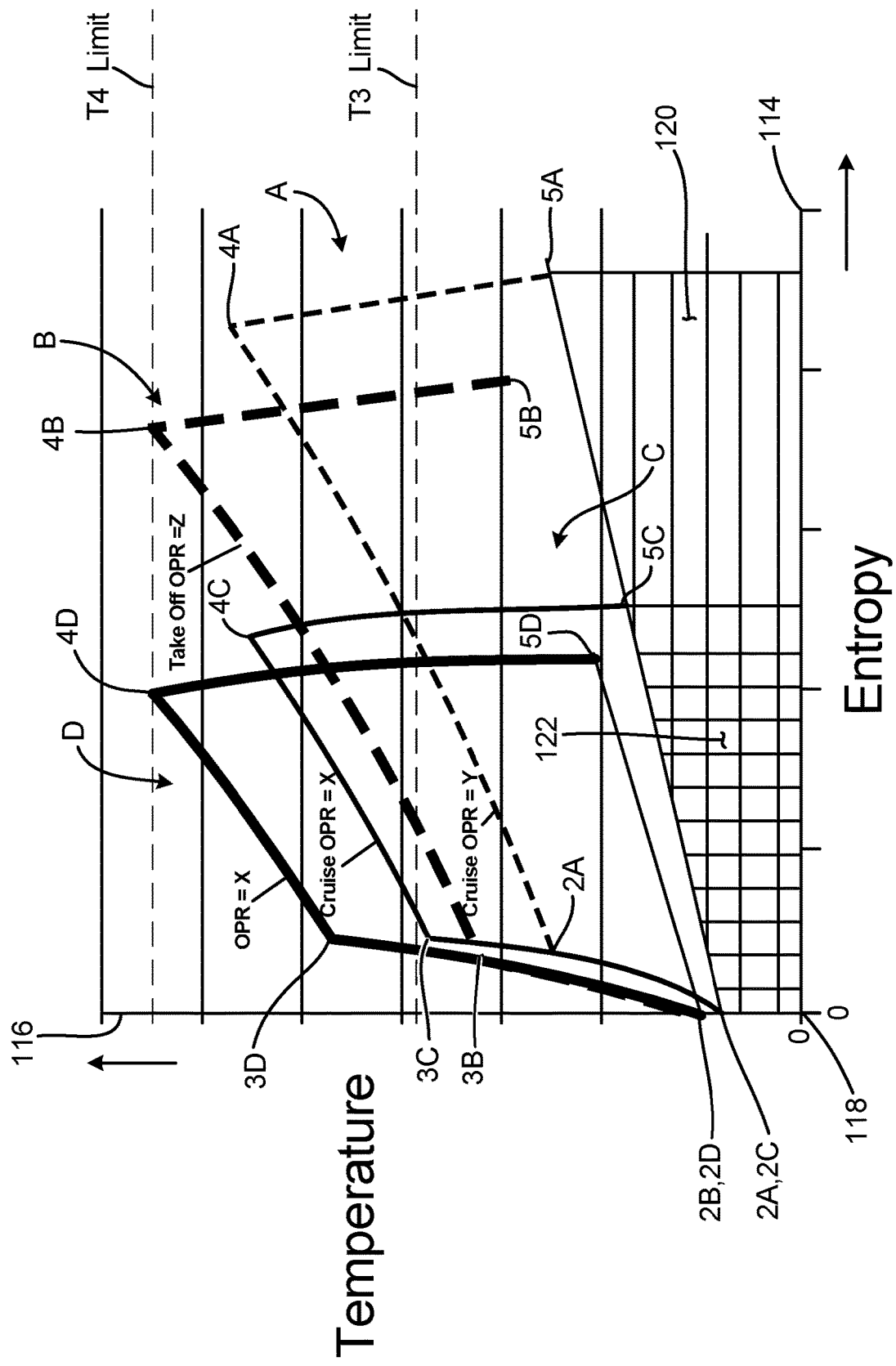
FIG. 6 is a T-s diagram illustrating the thermodynamic performance of a gas turbine engine operating with a boost spool relative to a gas turbine engine operating without a boost spool.

FIG. 6 is a T-s diagram illustrating the thermodynamic performance of gas turbine engine 10 boosted by spool 12 relative to gas turbine engine 10 operating without boost spool 12. Entropy is displayed along abscissa axis 114, and temperature is displayed along ordinate axis 116, each increasing from origin 118. Dashed curve A depicts the thermodynamic cycle of unboosted gas turbine engine 10 operating at cruise power. Dashed curve B depicts the thermodynamic cycle of unboosted gas turbine engine 10 operating at takeoff power on a hot day. Solid curve C depicts gas turbine engine 10 operating with boost spool 12 at cruise power. Solid curve D depicts another gas turbine engine operating at takeoff power on a hot day having an OPR (value=X) that is equal to the OPR of boosted gas turbine engine 10 operating at cruise power.

Each of curves A, B, C, and D are defined by points 2, 3, 4, and 5, respectively. Accordingly, dashed curve A extends from point 2A to point 3A, representing the compression work completed by engine 10 between engine inlet 48 and the exit of high pressure compressor 24 (see FIGS. 1A and 2A). From point 3A, dashed curve A extends along a line of constant pressure ratio (value=Y) to point 4A that represents the heat added to core flow 58 through combustion. After combustion, high pressure turbine 26 and low pressure turbine 20 extract work from the heated and compressed core flow 58, a process represented by dashed line A between points 4A and 5A. Dashed curve B extends between point 2B to point 3B during the compression phase, between point 3B and 4B along a line of constant pressure ratio (value=Z) during combustion, and between point 4B and 5B during turbine expansion. Solid curves C and D are defined by points 2C, 3C, 4C, and 5C and points 2D, 3D, 4D, and 5D in a similar manner to curves A and B. An engine operating along curve A has less OPR (value Y) than an engine operating on any of the other curves (i.e., curves C and D having an OPR equal to value X and curve B having an OPR value equal to Z). Moreover, an engine operating on curves C and D have an OPR value X that is greater than an engine operating on curve B with an OPR value Z.

The temperature entering the compressor section of gas turbine engine 10 at cruise power is lower than the temperature entering the compressor section of gas turbine engine 10 at takeoff power because the ambient temperature at cruising altitude is lower than the ambient temperature during a hot day takeoff. For example, at cruising altitude, the ambient temperature can be approximately −26.1 degrees Celsius (or about −15 degrees Fahrenheit) while on a hot day takeoff, the ambient temperature can be approximately 46.1 degrees Celsius (or about 115 degrees Fahrenheit). For each curve, the temperature within the engine at points 3A, 3B, 3C, and 3D are limited to a line of constant temperature labeled "T3 Limit" while the temperature at points 4A, 4B, 4C, and 4D are limited to a line of constant temperature labeled "T4 Limit".

Unboosted operation of gas turbine engine 10 represented by dashed curves A and B present a compromise between temperature limits during a hot day takeoff and cruising. As a result, the OPR of unboosted operation of engine 10 is limited by hot day takeoff conditions (i.e., the temperature at point 4B is limited by the T3 Limit). The area bounded by dashed curve A and a line connecting points 5A and 2A represent the amount of work completed by engine 10 while operating at cruise power and without boost spool 12 operation. The amount of heat energy rejected by gas turbine engine 10 while operating in accordance with dashed curve A is shown by horizontally-hatched area 120. The thermodynamic efficiency of gas turbine engine 10 operating in accordance with dashed curve A is the work energy divided by the summation of work and rejected heat energy defined by curve A.

Contrastingly, the work performed by gas turbine engine 10 with the aid of boost spool 12 is bounded by curve C and a line extending between points 5C and 2C while the heat energy rejected by boosted gas turbine engine 10 operating at cruise power is shown by vertically-hatched area 122. Regions where areas 120 and 122 overlap appear as a square-hatched area. By comparing the sizes of work areas bounded by curves A and C relative to heat rejection areas 120 and 122, respectively, it is evident that work area C represents a larger percentage of the total area under curve C than corresponding areas under curve A. Accordingly, operating gas turbine engine 10 with boost spool 12 at cruise power results in more efficient thermodynamic operation and, thus, improved thrust specific fuel consumption (TSFC) than operating engine 10 without boost spool 12. Furthermore, a gas turbine engine with the same OPR as boost engine operation depicted by curve D does not satisfy thermal limits at points 3D and 4D as shown in FIG. 6 (i.e., the temperature at 3D exceeds the T3 Limit, and the temperature at 4D exceeds the T4 limit). As such, gas turbine engine 10 can be operated without boost spool 12 during hot day takeoff conditions (i.e., dashed curve B) and can be operated with boost spool 12 at cruise power (i.e., solid curve C) to achieve greater thermal efficiency at cruise power while satisfying thermal limits for hot day takeoff conditions.

The following are non-exclusive descriptions of possible embodiments of the present invention.

A gas turbine engine according to an exemplary embodiment of this disclosure includes, among other possible things, a first spool, a second spool, a primary combustor and a diffuser. The first spool includes a first compressor rotationally driven by a first turbine via a first shaft. The second spool includes a second compressor rotationally driven by a second turbine via a second shaft. The first compressor, the diffuser, and the primary combustor are arranged in series to provide a compressed airflow discharged from the first compressor to the primary combustor via the diffuser, which includes walls that diverge towards the primary combustor. The second compressor is fluidly coupled to the diffuser to receive at least a portion of the compressed airflow from the diffuser. The second turbine is fluidly coupled to the diffuser to discharge an expanded airflow to the diffuser.

The gas turbine engine of the preceding paragraph can optionally include, additionally and/or alternatively, any one or more of the following features, configurations and/or additional components:

A further embodiment of the foregoing gas turbine engine can further comprise a clutch selectively coupling the second spool to the first spool, wherein the second spool drives the first spool when the clutch is engaged and the second spool rotates independently of the first spool when the clutch is disengaged.

A further embodiment of any of the foregoing gas turbine engines can further include an auxiliary gear box mechanically coupling the first spool to one or more auxiliary components in which the clutch mechanically couples the second spool to the first spool via the auxiliary gear box.

A further embodiment of any of the foregoing gas turbine engines can further comprise a third spool comprising a third compressor rotationally driven by a third turbine via a third shaft and arranged concentrically with respect to the first spool.

A further embodiment of any of the foregoing gas turbine engines, wherein the third spool is one of a high pressure spool and a low pressure spool and the first spool is the other one of the high pressure spool and the low pressure spool.

A further embodiment of any of the foregoing gas turbine engines can further comprise a secondary combustor disposed downstream from the second compressor and upstream from the second turbine.

A further embodiment of any of the foregoing gas turbine engines, wherein the second compressor, the secondary combustor, and the second turbine can be arranged in series to provide compressed boost airflow discharged from the second compressor to the secondary combustor and a combusted boost airflow from the secondary combustor to the second turbine.

A further embodiment of any of the foregoing gas turbine engines, wherein the second compressor can receive the portion of the compressed airflow and a remainder of the compressed airflow bypasses the second spool.

A further embodiment of any of the foregoing gas turbine engines, wherein the second turbine can expand the portion of compressed airflow and thereby form an expanded airflow.

A further embodiment of any of the foregoing gas turbine engines, wherein the expanded airflow can discharge to the diffuser and mix with the remainder of the compressed airflow.

A further embodiment of any of the foregoing gas turbine engines can further include a plurality of inlet ducts fluidly coupling the diffuser to the second compressor of the second spool.

A further embodiment of any of the foregoing gas turbine engines can further include a plurality of outlet ducts fluidly coupling the second turbine to the diffuser.

A further embodiment of any of the foregoing gas turbine engines, wherein each of the outlet ducts of the plurality of outlet ducts can have a discharge area and the discharge areas are circumferentially distributed within the diffuser.

A further embodiment of any of the foregoing gas turbine engines can further include a plurality of struts circumferentially spaced within the diffuser.

A further embodiment of any of the foregoing gas turbine engines, wherein each strut can extend from a radially inner wall of the diffuser to a radially outer wall of the diffuser.

A further embodiment of any of the foregoing gas turbine engines, wherein the discharge area of each outlet duct can be formed by one of the struts.

A further embodiment of any of the foregoing gas turbine engines, wherein a centerline axis of the second spool is oblique or perpendicular to a centerline axis of the first spool.

A further embodiment of any of the foregoing gas turbine engines, wherein a centerline axis of the second spool is offset and parallel to a centerline axis of the first spool.

A further embodiment of any of the foregoing gas turbine engines can further include a first motor generator mechanically connected to the first shaft of the first spool.

A further embodiment of any of the foregoing gas turbine engines can further include a second motor generator mechanically connected to the second shaft of the second spool.

A further embodiment of any of the foregoing gas turbine engines, wherein the first motor generator can be electrically coupled to the second motor generator.

A further embodiment of any of the foregoing gas turbine engines can further include a plurality of inlet guide vanes fluidly disposed between the diffuser and the second compressor.

A further embodiment of any of the foregoing gas turbine engines, wherein each vane of the plurality of inlet guide vanes can rotate about a vane axis to vary the portion of compressed air received from the diffuser.

A further embodiment of any of the foregoing gas turbine engines, wherein the vane axis of each vane of the plurality of inlet guide vanes is aligned with a radial direction of the second spool.

A further embodiment of any of the foregoing gas turbine engines can further include a main clutch selectively coupling the first spool to the auxiliary gear box.

A further embodiment of any of the foregoing gas turbine engines, wherein the discharge areas of the plurality of outlet ducts are biased towards a midspan portion of each diffuser strut to direct the expanded airflow towards a central portion of the diffuser.

A further embodiment of any of the foregoing gas turbine engines, wherein the second spool can be a reverse flow spool having a direction of airflow from the second compressor to the second turbine that is opposite a direction of airflow through the first spool from the first compressor to the first turbine.

A further embodiment of any of the foregoing gas turbine engines can further comprise a fan driven by at least one of the first spool and the second spool.

A further embodiment of any of the foregoing gas turbine engines can further include a bypass duct downstream from the fan.

A further embodiment of any of the foregoing gas turbine engines can further include a splitter dividing a first portion of airflow discharged from the fan into a bypass flow and a second portion of airflow discharged from the fan into a core flow delivered to the first compressor of the first spool.

A further embodiment of any of the foregoing gas turbine engines, wherein the plurality of inlet ducts can be placed in a heat exchange relationship with the bypass flow.

A gas turbine engine according to another exemplary embodiment of this disclosure includes, among other possible things, a boost spool comprising an inlet characterized by an inlet pressure, a boost compressor section characterized by a compressor pressure ratio; and a boost turbine section characterized by a turbine pressure ratio, and an outlet characterized by an outlet pressure. The product of the compressor pressure ratio and the turbine pressure ratio produces a pressure ratio equal to the outlet pressure divided by the inlet pressure that is greater than 0.9:1 and less than 1.8:1, inclusive.

The gas turbine engine of the preceding paragraph can optionally include, additionally and/or alternatively, any one or more of the following features, configurations and/or additional components:

A further embodiment of the foregoing gas turbine engine, wherein the pressure ratio is greater than 1:1 and less than 1.8:1, inclusive.

An assembly according to another exemplary embodiment of this disclosure includes, among other possible things, a first gas turbine engine, a second gas turbine engine, and a boost spool. The first gas turbine engine comprises a first compressor, a first turbine, a first shaft, a first primary combustor, and a first diffuser. The first compressor is rotationally driven by the first turbine via a first shaft. The first diffuser includes walls that diverge towards the first primary combustor. Together, the first compressor, the first diffuser, and the primary combustor are arranged in series to provide a compressed airflow discharged from the first compressor to the first primary combustor via the first diffuser. The second gas turbine engine comprises a second compressor, a second turbine, a second shaft, a second primary combustor, and a second diffuser. The second compressor is rotationally driven by the second turbine via a second shaft. The second diffuser includes walls that diverge towards the second primary combustor. Together, the second compressor, the second diffuser, and the primary combustor are arranged in series to provide a compressed airflow discharged from the second compressor to the second primary combustor via the second diffuser. The boost spool includes a boost compressor rotationally driven by a boost turbine via a boost shaft. A secondary combustor is disposed downstream from the boost compressor and upstream from the boost turbine. The boost compressor is fluidly coupled to the first and second diffusers to receive at least a portion of the compressed airflow from the first and second diffusers. The boost compressor, the secondary combustor, and the boost turbine are arranged in series to provide a compressed boost airflow discharged from the boost compressor to the secondary combustor and a combusted boost airflow from the secondary combustor to the boost turbine. The boost turbine is fluidly coupled to the first and second diffusers to discharge an expanded airflow to each of the first and second diffusers.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising:
   a first spool comprising a first compressor rotationally driven by a first turbine via a first shaft;
   a first primary combustor;
   a first diffuser having walls that diverge towards the first primary combustor, wherein the first compressor, the first diffuser, and the first primary combustor are arranged in series to provide a compressed airflow discharged from the first compressor to the first primary combustor via the first diffuser;
a boost spool comprising a boost compressor rotationally driven by a boost turbine via a boost shaft;
a secondary combustor disposed downstream from the boost compressor and upstream from the boost turbine;
a plurality of inlet ducts fluidly coupling the first diffuser to the boost compressor of the boost spool;
a plurality of outlet ducts fluidly coupling the boost turbine to the first diffuser; and
a plurality of struts circumferentially spaced within the first diffuser, each strut extending from a radially inner wall of the first diffuser to a radially outer wall of the first diffuser;
wherein:
the boost compressor is fluidly coupled to the first diffuser to receive at least a portion of the compressed airflow from the first diffuser;
the boost compressor, the secondary combustor, and the boost turbine are arranged in series to provide a compressed boost airflow discharged from the boost compressor to the secondary combustor and a combusted boost airflow from the secondary combustor to the boost turbine;
the boost turbine is fluidly coupled to the first diffuser to discharge an expanded airflow to the first diffuser; and
each outlet duct of the plurality of outlet ducts has a discharge area, and wherein the discharge areas are circumferentially distributed between the radially inner wall and the radially outer wall of the first diffuser and formed by one of the struts, such that the expanded airflow from the boost turbine and the compressed airflow from the first compressor are mixed within the first diffuser.

2. The gas turbine of claim 1, and further comprising:
a clutch selectively coupling the boost spool to the first spool, wherein the boost spool drives the first spool when the clutch is engaged and the boost spool rotates independently of the first spool when the clutch is disengaged.

3. The gas turbine engine of claim 2, and further comprising:
an auxiliary gear box mechanically coupling the first spool to one or more auxiliary components, wherein the clutch mechanically couples the boost spool to the first spool via the auxiliary gear box.

4. The gas turbine engine of claim 3, and further comprising:
a third spool comprising a third compressor rotationally driven by a third turbine via a third shaft and arranged concentrically with respect to the first spool, wherein the third spool is one of a high pressure spool and a low pressure spool and the first spool is the other one of the high pressure spool and the low pressure spool.

5. The gas turbine engine of claim 1, wherein the boost compressor receives the portion of the compressed airflow and a remainder of the compressed airflow bypasses the boost spool.

6. The gas turbine engine of claim 5, wherein the boost turbine extracts work from the portion of compressed airflow to form the expanded airflow, and wherein the expanded airflow discharges to the first diffuser and mixes with the remainder of the compressed airflow.

7. The gas turbine engine of claim 1, wherein a centerline axis of the boost spool is oblique or perpendicular to a centerline axis of the first spool.

8. The gas turbine engine of claim 1, wherein a centerline axis of the boost spool is offset and parallel to a centerline axis of the first spool.

9. The gas turbine engine of claim 1, and further comprising:
a first motor generator mechanically connected to the first shaft of the first spool; and
a second motor generator mechanically connected to the boost shaft of the boost spool, wherein the first motor generator is electrically coupled to the second motor generator.

10. The gas turbine engine of claim 1, and further comprising:
a plurality of inlet guide vanes fluidly disposed between the diffuser and the boost compressor, wherein each vane of the plurality of inlet guide vanes is rotatable about a vane axis to vary the portion of the compressed airflow received from the first diffuser.

11. The gas turbine engine of claim 3, and further comprising:
a main clutch selectively coupling the first spool to the auxiliary gear box.

12. The gas turbine engine of claim 1, wherein the discharge areas of the plurality of outlet ducts are biased towards a midspan portion of each strut to direct the expanded airflow towards a central portion of the first diffuser.

13. The gas turbine engine of claim 1, wherein the boost spool is a reverse flow spool having a direction of airflow from the boost compressor to the boost turbine that is opposite a direction of airflow through the first spool from the first compressor to the first turbine.

14. The gas turbine of claim 1, and further comprising:
a fan driven by at least one of the first spool and the boost spool;
a bypass duct downstream from the fan; and
a splitter dividing a first portion of airflow discharged from the fan into a bypass flow and a second portion of airflow discharged from the fan into a core flow delivered to the first compressor of the first spool;
wherein the plurality of inlet ducts is placed in a heat exchange relationship with the bypass flow.

15. The gas turbine engine of claim 1, wherein:
the boost spool comprises:
an inlet characterized by an inlet pressure; and
an outlet characterized by an outlet pressure;
the boost compressor is characterized by a compressor pressure ratio;
the boost turbine is characterized by a turbine pressure ratio; and
the product of the compressor pressure ratio and the turbine pressure ratio produces a pressure ratio equal to the outlet pressure divided by the inlet pressure that is greater than 0.9:1 and less than 1.8:1 inclusive.

16. The assembly of claim 15, wherein the pressure ratio is greater than 1:1 and less than 1.8:1 inclusive.

17. An assembly comprising:
the gas turbine engine of claim 1;
a second gas turbine engine discrete from the gas turbine engine of claim 1, the second gas turbine engine comprising a second compressor rotationally driven by a second turbine via a second shaft, a second primary combustor, and a second diffuser having walls that diverge towards the second primary combustor, wherein the second compressor, the second diffuser, and the second primary combustor are arranged in series to provide a compressed airflow discharged from the second compressor to the second primary combustor via the second diffuser;

wherein:
- the boost compressor is fluidly coupled to the first and second diffusers to receive at least a portion of the compressed airflow from each of the first and second diffusers;
- the boost compressor, the secondary combustor, and the boost turbine are arranged in series to provide a compressed boost airflow discharged from the boost compressor to the secondary combustor and a combusted boost airflow from the secondary combustor to the boost turbine; and
- the boost turbine is fluidly coupled to the first and second diffusers to discharge an expanded airflow to each of the first and second diffusers.

* * * * *